3,196,045
PROCESS FOR PURIFYING SUGAR
SOLUTIONS
Kazuhiko Mihara and Takashi Yamashiki, Yokohama, and Koichiro Kondo, Nobeoka-shi, Japan, assignors to Asahi Kasei Kogyo Kabushiki Kaisha, Osaka, Japan, a corporation of Japan
Filed Dec. 14, 1962, Ser. No. 244,834
Claims priority, application Japan, Apr. 5, 1962, 37/12,860
3 Claims. (Cl. 127—46)

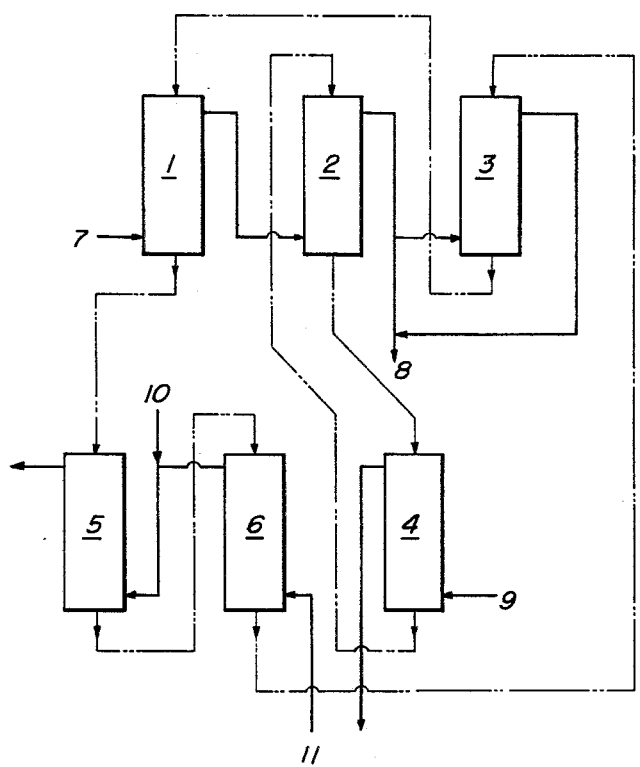

The present invention relates to a process for purifying sugar solutions by use of ion exchange resins. Such sugar solutions may include raw sugar juice or sugar containing liquors.

An object of the invention is to provide an economical process for the purification of sugar solutions, by a simple combination of ion-exchanging procedures and by use of low-priced regenerating agents.

There are many problems in the purification of sugar solutions by the use of ion exchange resins. There have been proposed various complicated combinations of ion exchange resins (simply referred to hereunder as "resin"), but only a few of them are successful.

On account of the removal of salts in sugar solution, a combination of a strongly acidic resin and a strongly basic resin is most suitable. However, the use of strongly acidic resin tends to cause inversion of the sugar in solution, so that it is necessary to lower the temperature of the sugar solution to below 15° C. Furthermore, both resins are difficultly regenerated with an acid and an alkali, so that large amounts of regenerating agents are needed in the case of a fixed bed system, this being uneconomical.

If weakly acidic and weakly basic resins are employed, the removal of salts is insufficient and leakage of ions occurs after a short period of operation, thus yielding unsatisfactory results, since their ability to decompose neutral salts is low. To overcome these short-comings, an exceedingly complicated apparatus would be needed.

The inventors have succeeded in providing a reasonable and economical process for purifying sugar solutions, by employing a continuous ion exchange process by which the most efficient contact reaction of a sugar solution with resin in counter-current system is effected, namely by purifying the sugar solution by passing the same sequentially into a strongly basic anion exchange resin vessel and weakly acidic cation exchange resin vessel and controlling the pH of the solution in a strongly basic anion exchange resin vessel.

According to the process of the invention, a sugar solution is first contacted with a strongly basic anion exchange resin, whereby the neutral salts involved in the solution are decomposed. Thereafter, the solution is contacted with a weakly acidic cation exchange resin, whereby the removal of the salts is effected through the adsorption of cation. In this process, there is little possibility of inversion of sugar, if the process is carried out at a temperature of about 30° C.

Furthermore, the regeneration of resins in the process of the invention is conducted continuously and proceeds in almost theoretical relationship of amounts. Thus, the process of the purification of sugar solutions according to the invention is superior from an economical point of view, even though a strongly basic anion exchange resin is employed.

The process of the invention is illustrated with reference to the sole figure in the appended drawing. In the drawing the first column 1 is an anion exchange column and is filled with a strongly basic anion exchange resin (OH type). The second column 2 is a cation exchange column and is filled with a weakly acidic cation exchange resin (H type) while the third column 3 is a pH adjustment column which is filled with a strongly basic anion exchange resin (OH type). A crude sugar solution 7, the temperature of which has preliminarily been lowered to about 30° C. by means of a heat-exchanging apparatus (not shown), is passed through the first column, in which a major part of color ions and anions in the crude sugar solution to be treated are removed. The treated liquor is then passed through the second column, in which cations present in a free state and remaining in salt form are removed. (In the figure, the flow of liquids are shown by solid lines.)

The thus purified sugar solution 8 withdrawn from the second column is colorless and has an electroconductivity of almost the same level as soft water, but its pH is somewhat lower, which may cause inversion of the sucrose. Accordingly, a part of the sugar solution 8 is passed through the third column. The sugar solution withdrawn from the third column is somewhat alkaline, so that it is mixed in a suitable amount with the sugar solution 8 to adjust the pH of the mixture to a value between 7 and 8. The sugar solution after the admixture has a Stammer's color value of less than 0.1, de-salting ratio of 99.5% or more, and pH 7-8, and is suitable for use as it is in the concentration step. This purified sugar solution is heat-exchanged with a fresh crude sugar solution to be elevated to about 75° C. and then sent to the concentration step. In consequence, inversion of sucrose caused in the purification process is negligibly small, considering the increase in yield. Regeneration of the weakly acidic cation exchange resin in the process of the invention is very easy. In this process, the regeneration is effected by use of a dilute sulfuric acid, which is economically advantageous, though it may be effected by use of hydrochloric acid.

The weakly acidic cation exchange resin withdrawn from the second column is transferred to a fourth column or cation regenerating column, where the cation exchange resin is regenerated by dilute sulfuric acid 9, and again recycled to the second column. (In this figure, the flow of resins is shown by dotted lines.) The fifth and sixth columns, 5 and 6, respectively constitute decoloring and anion regenerating columns and are provided for the regeneration of the strongly basic anion exchange resin. The strongly basic anion exchange resin is circulated in the order of first, fifth, sixth, third, and first columns. The fifth column is for de-coloration, in which the resin having color and anionic substance adsorbed in the first column is de-colored by treatment with sodium chloride solution 10 at about 50° C., thereby the resin is changed to a Cl type resin.

The Cl type resin is regenerated to OH type in the sixth column by treatment with a suitable concentration of a sodium hydroxide solution 11.

The liquor obtained after this treatment contains sodium chloride and can be used as it is for the de-coloration in the fifth column. This system is possible only in the continuous ion exchanging process of the invention, and is exceedingly economical, since the anion exchange resin is regenerated and de-colored with NaOH and a small amount of NaCl. The resin withdrawn from the sixth column is transferred to the third column, where it is used for the pH adjustment, and then recycled to the first column.

The sugar solution accompanied by the transferring resin may be wholly substituted with water without loss, and removed according to a method described in the specification of U.S. patent application No. 207,556 by a continuous ion-exchanging apparatus comprising an outlet of the solution to be treated with ion-exchangers provided at the middle thereof, an outlet of the accompanying sugar solution provided at the top thereof and an inlet of the solution to be treated.

Example

A beet sugar juice obtained after carbon dioxide saturation and having Stammer's color value of 50, total anion and cation (as $CaCO_3$) of 4000 p.p.m. and specific electroconductivity of 4000 $\mu v./cm.$ is treated according to the process as described above. The sugar solution purified has a Stammer color value of 0.05, a specific electroconductivity of 25 $\mu v./cm.$, and a pH of 8.

The invert sugar increase after the process is not more than 1%, based upon the total sugar amount.

What we claim is:

1. A process for purifying sugar solutions which comprises passing said sugar solution first through an anion exchange column with a bed of hydroxyl type strongly basic anion exchange resin, and then passing the treated solution from said anion exchange column through a cation exchange column with a bed of hydrogen type weakly acidic cation exchange resin, whereby said sugar solution is purified and decolored, introducing said anion exchange resin which contains adsorbed impurities into a decoloring column to be decolored and converted to Cl-type resin by contact with a sodium chloride solution, said Cl-type resin being then sent to an anion regenerating column to be regenerated to a hydroxyl type resin therein by contact with a sodium hydroxide solution, recycling an outflow solution of sodium chloride from said anion regenerating column to said decoloring column as a decoloring reagent, said regenerated hydroxyl type resin being sent from the anion regenerating column to a pH adjustment column to contact a portion of the outflow of purified sugar solution from said cation exchange column to effect elevation of the pH of said portion, mixing the portion of the sugar solution which has undergone pH adjustment with the remainder of the purified sugar solution to produce a purified product with a pH between 7 and 8, recycling said hydroxyl type anion exchange resin which is discharged from said pH adjustment column to said anion exchange column for reutilization therein, regenerating said cation exchange resin containing adsorbed impurities to a hydrogen type resin by contact of the cation resin with a mineral acid solution in the cation regenerating column, recycling said hydrogen type cation exchange resin to said cation exchange column for utilization therein, said column being separately arranged but functionally connected, said resins being continuously transferred between respective columns to form movable beds by being continuously discharged from the bottom of each respective column and introduced into the top portion of the next associated column, while the respective solutions are introduced into each column at the lower portion thereof and discharged therefrom at the upper portion thereof to effect counter current contact with the resin passing therethrough.

2. A process according to claim 1 which comprises adding a fresh sodium chloride solution to the sodium chloride solution which is discharged from said anion regenerating column and which is fed to said decoloring column as a decoloring reagent.

3. A process according to claim 1 which comprises arranging the amount of solution fed in to each of said columns to be equal the amount of solution discharged from each column by discharging a quantity of solution from the top of each column in an amount equal to the quantity of solution introduced into the lower portion of each column in addition to the amount of solution accompanying the resin fed into each column at the top thereof, thereby to extract the solution accompanied by the resin.

References Cited by the Examiner
UNITED STATES PATENTS 2,926,110  2/60  Shimizu et al. _____ 127—46
2,988,463  6/61  Vajna _____ 127—46

MORRIS O. WOLK, *Primary Examiner.*